(12) United States Patent
Ozaki et al.

(10) Patent No.: US 8,399,131 B2
(45) Date of Patent: Mar. 19, 2013

(54) COMPOSITE NEGATIVE ELECTRODE ACTIVE MATERIAL AND NON-AQUEOUS ELECTROLYTE SECONDARY BATTERY

(75) Inventors: Yoshiyuki Ozaki, Osaka (JP); Hiroyuki Fujimoto, Nara (JP)

(73) Assignee: Panasonic Corporation, Osaka (JP)

( * ) Notice: Subject to any disclaimer, the term of this patent is extended or adjusted under 35 U.S.C. 154(b) by 375 days.

(21) Appl. No.: 12/602,560

(22) PCT Filed: Jun. 2, 2008

(86) PCT No.: PCT/JP2008/001387
§ 371 (c)(1),
(2), (4) Date: Dec. 1, 2009

(87) PCT Pub. No.: WO2008/149539
PCT Pub. Date: Dec. 11, 2008

(65) Prior Publication Data
US 2010/0178563 A1    Jul. 15, 2010

(30) Foreign Application Priority Data

Jun. 1, 2007    (JP) .................................. 2007-146764

(51) Int. Cl.
*H01M 4/13*    (2010.01)
(52) U.S. Cl. ................. 429/231.8; 429/231.95; 429/235; 429/322
(58) Field of Classification Search ............ 429/322, 429/231.8, 231.95, 235
See application file for complete search history.

(56) References Cited

U.S. PATENT DOCUMENTS

| | | | |
|---|---|---|---|
| 5,153,082 A | 10/1992 | Ogino et al. | |
| 5,451,477 A | 9/1995 | Omaru et al. | |
| 5,723,232 A | 3/1998 | Yamada et al. | |
| 5,879,417 A | 3/1999 | Yamada et al. | |
| 5,965,296 A | 10/1999 | Nishimura et al. | |
| 6,482,547 B1 | 11/2002 | Yoon et al. | |
| 2003/0143463 A1* | 7/2003 | Yoon et al. | 429/231.4 |
| 2004/0151837 A1 | 8/2004 | Morita et al. | |
| 2004/0219431 A1* | 11/2004 | Ozaki et al. | 429/231.4 |
| 2006/0147799 A1* | 7/2006 | Hayashi et al. | 429/231.8 |

FOREIGN PATENT DOCUMENTS

| | | |
|---|---|---|
| CN | 1682392 A | 10/2005 |
| EP | 0 740 356 | 10/1996 |
| JP | 7-326343 | 12/1995 |
| JP | 10-040914 | 2/1998 |

(Continued)

OTHER PUBLICATIONS

Chinese Office Action issued in Chinese Patent Application No. 200880018479.4, dated Aug. 24, 2011.

(Continued)

*Primary Examiner* — Patrick Ryan
*Assistant Examiner* — Ben Lewis
(74) *Attorney, Agent, or Firm* — McDermott Will & Emery LLP

(57) ABSTRACT

Disclosed is a composite negative electrode active material including a graphitizable carbon material containing a layered structure formed of stacked carbon layers partially having a three-dimensional regularity, and a low crystalline carbon material. A negative electrode including the composite negative electrode active material is used to produce a non-aqueous electrolyte secondary battery. The non-aqueous electrolyte secondary battery thus produced has a high energy density and demonstrates a high output/input performance for a long period of time in various environments of high to low temperatures.

7 Claims, 2 Drawing Sheets

FOREIGN PATENT DOCUMENTS

| | | |
|---|---|---|
| JP | 10-302775 | 11/1998 |
| JP | 11-054123 | 2/1999 |
| JP | 11-246209 | 9/1999 |
| JP | 11-310405 | 11/1999 |
| JP | 2000-123835 | 4/2000 |
| JP | 3193342 B2 | 7/2001 |
| JP | 2003-031218 | 1/2003 |
| JP | 2004-071580 A | 3/2004 |
| JP | 2004-335132 | 11/2004 |
| JP | 2005-32593 | 2/2005 |
| JP | 2005-123175 | 5/2005 |
| JP | 2005-142004 A | 6/2005 |
| JP | 2005-200276 | 7/2005 |
| JP | 2006-294476 A | 10/2006 |
| JP | 2007-103246 A | 4/2007 |
| WO | WO 2005/031898 | 4/2005 |

OTHER PUBLICATIONS

Reply to Notification of Jul. 29, 2008 from the Examiner of the Patent Office issued in International Patent Application No. PCT/JP2008/001387.

United States Office Action, issued in U.S. Appl. No. 12/297,381, dated Oct. 12, 2011.

Japanese Office Action issued in Japanese Patent Application No. JP 2007-146764 dated Nov. 15, 2012.

US Office Action issued in U.S. Appl. No. 12/297,381 issued on Mar. 8, 2012.

\* cited by examiner

COMPOSITE NEGATIVE ELECTRODE ACTIVE MATERIAL AND NON-AQUEOUS ELECTROLYTE SECONDARY BATTERY

RELATED APPLICATIONS

This application is the U.S. National Phase under 35 U.S.C. §371 of International Application No. PCT/JP2008/001387, filed on Jun. 2, 2008, which in turn claims the benefit of Japanese Application No. 2007-146764, filed on Jun. 1, 2007, the disclosures of which Applications are incorporated by reference herein.

TECHNICAL FIELD

The present invention relates to a composite negative electrode active material and a non-aqueous electrolyte secondary battery. More specifically, the present invention mainly relates to an improvement of a carbon material-based negative electrode active material.

BACKGROUND ART

As small secondary batteries, there have been conventionally known, for example, lithium ion secondary batteries, rechargeable nickel-cadmium batteries, nickel metal hydride batteries, small sealed lead storage batteries, and the like. Among these, lithium ion secondary batteries, because of their high operating voltages, capacities, and energy densities, have been put into practical use mainly as power sources for driving portable electronic devices such as cellular phones, notebook personal computers, video camcorders, and digital still cameras, and there has been an increasing demand for such lithium ion secondary batteries.

In lithium ion secondary batteries, for the positive electrode active material, a lithium-containing composite oxide having a hexagonal crystal structure such as $LiCoO_2$ and $LiNiO_2$, a lithium-containing composite oxide having a spinel structure such as $LiMn_2O_4$, and other lithium-containing composite oxides have been mainly used. By using such lithium-containing composite oxides, lithium ion secondary batteries having a 4V-class high-voltage are provided. In particular, by using $LiCoO_2$, lithium ion secondary batteries having a further improved operating voltage and energy density are provided. For this reason, $LiCoO_2$ has been predominantly used as the positive electrode active material.

For the negative electrode active material, carbon materials capable of absorbing and desorbing lithium ions have been used. Among such carbon materials, a graphite material has been predominantly used as the negative electrode active material. A graphite material is suitable for providing lithium ion secondary batteries having a flat discharge potential and a high capacity density. As such, by using $LiCoO_2$ and a graphite material in combination, it is possible to provide a lithium ion secondary battery having both a high capacity and a high energy density and being suitable for use in small-sized consumer apparatus.

In recent years, the technological development for making such lithium ion secondary batteries suitable not only for use in small-sized consumer apparatus but also for use in electric power storage apparatus, electric vehicles, and the like, has been accelerated. In particular, in the field of hybrid electric vehicles (hereinafter referred to as "HEVs"), vehicles in practical use of mass production type powered by a gasoline engine and a nickel metal hydride battery have been developed and are now commercially available. HEVs have been developed for the purpose of reducing the amount of carbon dioxide emission, which is the major cause of global warming. In order to achieve this purpose at a high level and to further improve the power performance and safety performance of the HEVs, with regard to the secondary batteries serving as one of driving power sources for HEVs, a further improvement in performance is required.

Under these circumstances, as a substitute for nickel metal hydride batteries, lithium ion secondary batteries for HEVs have been developed at a rapid pace, and some of such lithium ion secondary batteries have been already put into practical use. In addition, it is predicted that fuel cell-powered vehicles using an output power from a fuel cell to drive the motor will be widely used in the future. For such fuel cell-powered vehicles, secondary batteries having a high output and input and a long service life are indispensable in order to assist the fuel cell, and therefore, high expectation has been placed on lithium ion secondary batteries.

It is necessary for batteries serving as driving power sources for electric vehicles such as HEVs and fuel cell-powered vehicles to instantaneously provide power-assist to the gasoline engine or motor (output) or instantaneously regenerate energy (input), with a given capacity. For this reason, lithium ion secondary batteries to be used for this application are expected to have a high output/input that is considerably much higher than that of lithium ion secondary batteries for use in small-sized consumer apparatus. In order to achieve a higher output/input of the battery, it is effective to reduce the internal resistance of the battery, for which various studies have been made with regard to the electrode structure, the battery components, the electrode active material, the electrolyte, and the like. For example, effective in reducing the internal resistance of the battery are an improvement of the current collecting structure of the electrode, an increase of the reaction area in the electrode by using a thinner and longer electrode, a preparation of a battery component using a less resistive material, and the like.

Further, effective in improving the output/input performance of lithium ion secondary batteries in a low temperature environment is a selection and modification of the electrode active material. In particular, a carbon material used as the negative electrode active material has a great influence on the ability of the negative electrode of absorbing and desorbing lithium ions, and thus on the output/input performance of the battery. This means that by using a carbon material being highly capable of absorbing and desorbing lithium as the negative electrode active material, a lithium ion secondary battery having a high output/input performance can be obtained.

When used in small-sized consumer apparatus, lithium ion secondary batteries are required to have a high capacity and a high energy density. Accordingly, in such lithium ion secondary batteries, with the priority put on the capacity and energy density, $LiCoO_2$ (positive electrode active material) and a graphite material (negative electrode active material) are used in combination; however, since the output/input performance of the graphite material is not sufficiently high, this combination cannot be predominant in the electric vehicle application and the like that require higher output and input. As for the carbon material serving as the negative electrode active material, in the case of using a carbon material that is not sufficiently graphitized rather than a highly crystalline graphite material, a high output/input performance can be obtained, although the battery capacity is slightly reduced. For such a carbon material, various proposals have been made.

For example, one proposal suggests a graphitizable carbon material of which the wide-angle X-ray diffraction pattern measured with CuKα radiation shows a ratio [I(101)/I(100)]

of a peak intensity I(101) attributed to a (101) plane to a peak intensity I(100) attributed to a (100) plane exceeds 0 and is less than 1.0 (see, e.g., Patent Document 1). The carbon material of Patent Document 1 is obtained by heating a coke material at about 1800° C. to 2200° C. to partially graphitize the coke material.

The grain size of the crystallite of this carbon material is comparatively small, and the crystal structure of this carbon material contains a large proportion of turbostratic structure in which a graphitized region and a non-graphitized region are co-present. As such, this carbon material is excellent in the output/input performance because of easy absorption and desorption of lithium ions thereto and therefrom and quick diffusion of lithium ions therein. However, with regard to the output/input performance during charge and discharge in a low temperature zone, a further improvement is expected.

Another proposal suggests a negative electrode active material having a bilayer structure comprising a core material of graphite powder and a coating layer provided on the surface of the core material, the coating layer made of a low crystalline carbon (see, e.g., Patent Document 2). The coating layer is formed by coating the surface of the graphite powder with a carbon precursor and heating the graphite powder with the carbon precursor in an inert gas atmosphere at a temperature of 700 to 2800° C. to carbonize the carbon precursor. Here, the carbon precursor is, as disclosed in paragraph [0018] of Patent Document 2, coal-tar pitch, various heavy oils, heat-treated pitch, vinyl-based resin, formaldehyde-based resin, aromatic hydrocarbon, nitrogen-containing heterocyclic compound, sulfur-containing heterocyclic compound, and the like.

The carbon precursor is converted into a low crystalline carbon through carbonization. Although the negative electrode active material of Patent Document 2 has a bilayer structure, the graphite material occupies the major portion thereof. Using a graphite material makes it easy to reliably achieve a high energy density; however, since graphite materials have large crystallites and thus has a large anisotropy, using a graphite material is not suitable for absorbing and desorbing lithium ions quickly. For this reason, with regard to the negative electrode active material of Patent Document 2 also, a further improvement in the output/input performance is expected.

Yet another proposal suggests a negative electrode active material having a bilayer structure comprising a core material being a composite of graphite and hard carbon and a coating layer provided on the surface of the core material, the coating layer made of a low crystalline carbon (see, e.g., Patent Document 3). Here, the hard carbon is a non-graphitizable carbon, which is prepared by carbonizing at 1000 to 1400° C. a non-meltable fiber being a by-product of the production of a carbon fiber, or alternatively carbonizing at 1000 to 1400° C. an oxide obtained by oxidizing an organic raw material in air at 150 to 300° C.

The organic raw material is coal- or petroleum-based isotropic pitch, phenolic resin, furan resin, furfural resin, and the like. Since the negative electrode active material of Patent Document 3 also contains graphite, resulted from the crystalline structure of graphite, the reaction of absorbing and desorbing lithium ions proceeds most slowly in a low temperature zone. Accordingly, the output/input performance in a low temperature zone of the negative electrode active material of Patent Document 3 is not in a fully satisfactory level.

In order to facilitate the reaction of absorbing and desorbing lithium ions particularly in a low temperature zone of 0° C. or lower, it is desirable to use a low-crystalline graphitizable carbon having a crystal structure containing a large proportion of turbostratic structure. However, the capacity density of the low-crystalline graphitizable carbon is 200 Ah/kg or less and the initial efficiency thereof is as low as 90% or less. Because of this, it is difficult to provide a higher energy density. For this reason, the low-crystalline graphitizable carbon is not suitable as a negative electrode active material for a lithium ion battery.

Patent Document 1: Japanese Laid-Open Patent Publication No. 2004-335132
Patent Document 2: Japanese Patent Publication No. 3193342
Patent Document 3: Japanese Laid-Open Patent Publication No. Hei 11-246209

DISCLOSURE OF THE INVENTION

Problem To be Solved by the Invention

The present invention intends to provide a negative electrode active material capable of providing the battery with a higher energy density and higher output/input for a long period of time in temperature environments of low to high temperatures, and a non-aqueous electrolyte secondary battery including the negative electrode active material and can be used as a power source for electric vehicles and the like.

Means for Solving the Problem

The present inventors have conducted intensive studies in order to solve the above-described problems, and found that when a graphitizable carbon material containing a layered structure formed of stacked carbon layers partially having a three-dimensional regularity is used in combination with a low crystalline carbon material, it is possible to provide a sufficiently high capacity density for practical use, as well as to obtain high output/input characteristics even in a low temperature environment in which the ability for absorbing and desorbing lithium ions tends to deteriorate. The present inventors have thus completed the invention.

Specifically, the present invention relates to a composite negative electrode active material including: a graphitizable carbon material containing a layered structure formed of stacked carbon layers partially having a three-dimensional regularity; and a low crystalline carbon material.

It is preferable that in a wide-angle X-ray diffraction pattern measured with CuKα radiation of the graphitizable carbon material containing a layered structure formed of stacked carbon layers partially having a three-dimensional regularity, a ratio [I(101)/I(100)] of a peak intensity I(101) attributed to a (101) plane at 2θ=about 44° to a peak intensity I(100) attributed to a (100) plane at 2θ=about 42° satisfies 0<I(101)/I(100)<1.0.

In a preferable embodiment, the surface of the graphitizable carbon material containing a layered structure formed of stacked carbon layers partially having a three-dimensional regularity is coated with the low crystalline carbon material.

The graphitizable carbon material containing a layered structure formed of stacked carbon layers partially having a three-dimensional regularity is coated with the low crystalline carbon material preferably by coating the surface of the graphitizable carbon material with a precursor of the low crystalline carbon material and then carbonizing the precursor.

The precursor of the low crystalline carbon material is carbonized preferably by heating the precursor at 600 to 1500° C.

The precursor of the low crystalline carbon material is preferably cokes.

In another preferable embodiment, at least part of the graphitizable carbon material containing a layered structure formed of stacked carbon layers partially having a three-dimensional regularity and at least part of the low crystalline carbon material are fused together.

The graphitizable carbon material containing a layered structure formed of stacked carbon layers partially having a three-dimensional regularity is preferably obtained by heating a graphitizable carbon material.

It is further preferable that the graphitizable carbon material is cokes and is heated at a temperature of 1800° C. to 2200° C.

The present invention further relates to a non-aqueous electrolyte secondary battery including a positive electrode, a negative electrode containing the composite negative electrode active material of the present invention, a separator, and a non-aqueous electrolyte.

Effect of the Invention

The composite negative electrode active material of the present invention has a sufficiently high capacity density for practical use, and the reaction of absorbing/desorbing lithium ion thereto and therefrom proceeds without slowing down even in a low temperature zone, particularly in a low temperature zone of 0° C. or lower. More advantageously, these favorable properties can be exerted stably for a long period of time. As such, the non-aqueous electrolyte secondary battery of the present invention containing the composite negative electrode active material of the present invention in its negative electrode has a high energy density as well as demonstrates a high output/input performance in a wide temperature zone ranging from low to high temperatures and has a long service life. The non-aqueous electrolyte secondary battery of the present invention can be used for the same applications as those of the conventional non-aqueous electrolyte secondary batteries, and can also be suitably used as a power source for power storage systems, electric vehicles such as HEVs and fuel cell-powered vehicles, and the like.

BEST MODE FOR CARRYING OUT THE INVENTION

Figure 1:
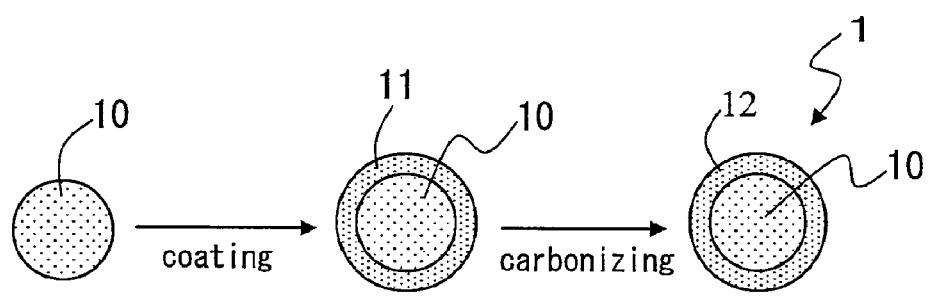
FIG. 1 is a vertical cross-sectional view schematically showing a production method of a composite negative electrode active material.

The composite negative electrode active material of the present invention includes a graphitizable carbon material containing a layered structure formed of stacked carbon layers partially having a three-dimensional regularity (hereinafter referred to as a "graphitizable carbon material under graphitization of the present invention"); and a low crystalline carbon material.

The graphitizable carbon material under graphitization of the present invention has a layered structure formed of stacked carbon layers (hexagonal carbon layers). The layered structure above is a turbostratic structure part of which has a three-dimensional regularity. Here, the three-dimensional regularity is a structure in which a plurality of carbon layers A and B are alternately layered, and the positional relationship therebetween is such that the carbon layers B are displaced from the carbon layers A along the a and b axes by a certain distance. The layered structure in the three-dimensional regularity is called an "AB layered structure". The three-dimensional regularity is also called a "graphitic regularity". The turbostratic structure is a layered structure in which carbon layers are stacked with no regularity.

In short, the graphitizable carbon material under graphitization of the present invention has a crystal structure in which the layered structure with three-dimensional regularity is partially present in the turbostratic structure of carbon layers. The graphitizable carbon material under graphitization of the present invention, like graphite, is capable of absorbing and desorbing lithium ions through intercalation reaction.

The graphitizable carbon material under graphitization of the present invention, because of the presence of the turbostratic structure, is capable of readily absorbing and desorbing lithium ions. Further, since the turbostratic structure absorbs the stress that is generated when expansion and contraction, phase change in the in-plane location, and the like occur in association with the absorption/desorption of lithium ions, the generated stress can be efficiently reduced as compared to the case of using graphite, and a high durability against a pulse charge/discharge at a larger current can be obtained. As such, the graphitizable carbon material under graphitization of the present invention has an excellent output/input performance and a long service life. In addition, the graphitizable carbon material under graphitization of the present invention, because of the presence of a three-dimensional regularity in its layered structure, has a sufficiently high capacity density for practical use, though it is not as high as that of a graphite material.

However, even when the graphitizable carbon material under graphitization of the present invention is used, the reaction speed of the reaction of absorbing/desorbing lithium ions thereto and therefrom (hereinafter simply referred to as the "absorbing/desorbing reaction") is reduced in a low temperature zone, particularly in a low temperature environment of 0° C. or lower, making it difficult to provide a fully satisfactory level of output/input performance. In order to increase the reaction speed of the absorbing/desorbing reaction in a low temperature environment, a carbonaceous structure that is highly dependent on the crystal structure in the surface of the particle and contains a large proportion of turbostratic structure is required.

The present inventors have found a configuration in which, on the surface of the graphitizable carbon material under graphitization of the present invention, a low crystalline carbon material containing a larger proportion of turbostratic structure than the graphitizable carbon material is allowed to be present. According to this configuration, the low crystalline carbon material, because of its turbostratic structure, has an increased number of randomly located lithium absorbing/desorbing sites and lithium diffusion paths, and thus functions as a diffusion channel that can shorten the migration time of lithium ions, resulting in an increased reaction speed of the absorbing/desorbing reaction. The present inventors have further found that such function of the low crystalline carbon material is unlikely to degrade even in a low temperature environment of 0° C. or lower.

Accordingly, by using the graphitizable carbon material under graphitization of the present invention and the low crystalline carbon material in combination, it is possible to obtain a negative electrode active material capable of preventing a reduction in the reaction speed of the absorbing/desorbing reaction in a low temperature zone and providing a high output/input performance even in a low temperature zone. Such an effect is achieved only when the low crystalline carbon material is allowed to be present on the surface of the graphitizable carbon material under graphitization of the present invention.

It should be noted that the remarkable effect as obtained in the present invention cannot be obtained when other materials in which the proportion of the turbostratic structure is higher than that in the low crystalline carbon material, such as a non-graphitizable carbon material being a carbon having an extreme level of turbostratic structure, is used. This is presumably because the graphitizable carbon material under graphitization of the present invention and the non-graphitizable carbon material are different from each other mainly in the charge/discharge mechanism.

In the case of the graphitizable carbon material under graphitization of the present invention and the low crystalline carbon material, the charge/discharge reaction proceeds as an interlayer intercalation reaction. In contrast, in the case of the non-graphitizable carbon and the like, the charge/discharge reaction proceeds as a reaction of complicated mechanism such as storing or absorbing of lithium into the carbon voids or the turbostratic structure. Because of this, the reaction speed of the absorbing/desorbing reaction in a low temperature zone is not sufficiently fast; and the pulse charge/discharge at a large current cannot be sufficiently performed. Moreover, since the irreversible capacity densities of the non-graphitizable carbon and the like are large, the battery capacity tends to be reduced.

The graphitizable carbon material under graphitization of the present invention can be produced by, for example, heating a graphitizable carbon material serving as a starting material to partially graphitize it.

Here, the graphitization degree of the graphitizable carbon material under graphitization of the present invention thus produced is not particularly limited, but preferably, in a wide-angle X-ray diffraction pattern measured with CuK$\alpha$ radiation thereof, $0<I(101)/I(100)<1.0$, and more preferably, $0.5<I(101)/I(100)<1.0$.

Here, the $I(100)$ is an intensity of a diffraction peak of the (100) plane observed at $2\theta$=about 42 degrees; and the $I(101)$ is an intensity of a diffraction peak of the (101) plane observed at $2\theta$=about 44 degrees. In other words, the $I(101)/I(100)$ is a ratio of diffraction peak intensities, and is a numerical value serving as an index of the graphitization degree. It should be noted that the $I(101)/I(100)$ of a graphite material is generally 1.5 or more.

For the graphitizable carbon serving as a starting material, any known material may be used, examples of which include cokes, such as petroleum coke and coal-tar pitch coke; meso-carbon microbeads (MCMB); and the like. The graphitizable carbon serving as a starting material can be synthesized by, for example, heating a precursor or a cross-linked precursor of the graphitizable carbon serving as a starting material.

As the precursor of graphitizable carbon serving as a starting material, any known material may be used, and in particular, a material containing an aromatic compound capable of electrophilic substitution is preferable. Examples thereof include a condensed polycyclic hydrocarbon compound, a condensed heterocyclic compound, a multi-ring compound, an aromatic oil, and a pitch.

Examples of the condensed polycyclic hydrocarbon compound include a condensed polycyclic hydrocarbon having two or more rings, such as naphthalene, azulene, indacene, fluorene, phenanthrene, anthracene, triphenylene, pyrene, chrysene, naphthacene, picene, perylene, pentaphene, and pentacene.

Examples of the condensed heterocyclic compound include a condensed heterocyclic compound consisting of a three or more membered heterocyclic rings and an aromatic hydrocarbon condensed together, such as indole, isoindole, quinoline, isoquinoline, quinoxane, phthalazine, carbazole, acridine, phenazine, and phenanthrozine.

Examples of the multi-ring compound include a compound consisting of aromatic hydrocarbon bonded by single bond, such as biphenyl and binaphthalene.

Examples of the aromatic oil include anthracene oil, decrystallized anthracene oil, naphthalene oil, methylnaphthalene oil, tar, creosote oil, ethylene bottom oil, carbolic oil, and solvent naphtha.

Examples of the pitch include a petroleum-based pitch and a coal-based pitch.

The compounds, oils, and pitches as listed above may have a substituent that exerts no adverse influence on the below-described cross-linking reaction of a precursor of the graphitizable carbon serving as a starting material. Examples of such a substituent include an alkyl group, a hydroxyl group, an alkoxy group, and a carboxyl group. The precursors may be used alone or in combination of two or more.

The cross-linked precursor can be synthesized by cross-linking a precursor of the graphitizable carbon serving as a starting material. This cross-linking reaction is preferably performed in the presence of a cross-linking agent, and more preferably performed in the presence of a cross-linking agent and an acid catalyst. By cross-linking a precursor of the graphitizable carbon serving as a starting material, a cross-linked precursor having a larger molecular weight than the precursor is synthesized; and by subsequently allowing the cross-linked precursor thus obtained to be subjected to heat treatment, the carbonization yield of the resultant graphitizable carbon serving as a starting material is increased.

For the cross-linking agent, any compound may be used as long as it is capable of cross-linking the precursor of the graphitizable carbon serving as a starting material, and in particular, a bifunctional compound is preferable. Examples thereof include aromatic dimethylene halides, such as xylene dichloride; aromatic dimethanols, such as xylene glycol; aromatic dicarbonyl halides, such as terephthaloyl chloride, isophthaloyl chloride, phthaloyl chloride, and 2,6-naphthalenedicarbonyl chloride; aromatic aldehydes, such as benzaldehyde, p-hydroxybenzaldehyde, p-methoxybenzaldehyde, 2,5-dihydroxybenzaldehyde, benzaldehyde dimethyl acetanol, telephthalaldehyde, isophthalaldehyde, and salicylaldehyde. These cross-linking agents may be used alone or, if necessary, in combination of two or more.

The amount of the cross-linking agent to be used can be selected appropriately from a wide range according to the type of the precursor of the graphitizable carbon serving as a starting material to be subjected to cross-linking, the type of the cross-linking agent itself, and the like. For example, in the case where the precursor of the graphitizable carbon serving as a starting material is a condensed polycyclic hydrocarbon compound and/or a condensed heterocyclic compound, the amount of the cross-linking agent to be used is preferably about 0.1 to 5 moles per 1 mole of the precursor of the graphitizable carbon serving as a starting material, and more preferably about 0.5 to 3 moles. In the case where the precursor of the graphitizable carbon serving as a starting material is a mixture of aromatic compounds such as pitches, the amount of the cross-linking agent to be used is preferably 0.01 to 5 moles based on the average molecular weight of the precursor of the graphitizable carbon serving as a starting material, and more preferably 0.05 to 3 moles.

For the acid catalyst, it is possible to use, for example, a commonly used acid, such as a Lewis acid and a Bronsted acid. Examples of the Lewis acid include $ZnCl_2$, $BF_3$, $AlCl_3$, $SnCl_4$, and $TiCl_4$. Examples of the Bronsted acid include an organic acid, such as p-toluenesulfonic acid, fluoromethanesulfonic acid, and xylene sulfonic acid; and a mineral acid, such as hydrochloric acid, sulfuric acid, and nitric acid. Among these examples, the Bronsted acid is preferable. The amount of the acid catalyst to be used can be selected appropriately from a wide range according to the reaction conditions, the type of the precursor of the graphitizable carbon serving as a starting material, the type of the cross-linking agent, the type of the acid catalyst itself, and the like, but preferably 0.01 to 10 mole equivalents based on the cross-linking agent, and preferably 0.5 to 3 mole equivalents.

The cross-linking reaction may be allowed to proceed in the presence or absence of a solvent, but is preferably allowed to proceed in the absence of a solvent. The cross-linking reaction is allowed to proceed preferably at a temperature of 80 to 400° C., and more preferably of at a temperature of 100 to 350° C., and is completed in about 0.1 to 3 hours. The cross-linking reaction can be allowed to proceed in an inert gas atmosphere such as of nitrogen, helium, and argon, or alternatively in an oxidizing atmosphere such as of air and oxygen. Upon completion of cross-linking reaction, the resultant reaction mixture is cooled to room temperature, whereby the cross-linked precursor can be collected as a solid resin material.

The heat treatment of the precursor or cross-linked precursor of the graphitizable carbon serving as a starting material is preferably performed in the presence of a graphitizing catalyst. For the graphitizing catalyst, any known boron atom-containing compound may be used, examples of which include elementary boron, boric acid, boron oxide, boron carbide, boron chloride, sodium borate, potassium borate, copper borate, and nickel borate. These graphitizing catalysts may be used alone or in combination of two or more. The amount of the graphitizing catalyst to be used can be selected appropriately from a wide range according to the reaction conditions (e.g., heating temperature, etc.), the types and amounts to be used of the precursor or cross-linked precursor of the graphitizable carbon serving as a starting material, and the like. For example, the amount of the graphitizing catalyst to be uses is preferably 0.1 to 20% by weight of the total amount used of the precursor or cross-linked precursor of the graphitizable carbon serving as a starting material, and more preferably 1 to 10% by weight.

The heat treatment of the precursor or cross-linked precursor of the graphitizable carbon serving as a starting material is performed by, for example, a method including the steps of mixing and stirring, carbonizing, and pulverizing.

In the mixing and stirring step, the precursor or cross-linked precursor of the graphitizable carbon serving as a starting material and the graphitizing catalyst are uniformly mixed and stirred together, to give a mixture. For example, the mixing and stirring step is performed at a temperature of about 250 to 400° C. for 1 minute or longer, preferably for 5 minutes or longer.

In the carbonizing step, the mixture obtained in the mixing and stirring step is carbonized. For example, the carbonizing step is performed at a temperature of about 700 to 1100° C. and is completed in about 0.1 to 5 hours.

In the pulverizing step, the carbonized material obtained in the carbonizing step (i.e., the graphitizable carbon serving as a starting material) is pulverized. For example, the pulverizing is performed until a volume average particle size of about 3 to 25 µm is obtained. It should be noted that if the carbonized material obtained in the carbonizing step is already in the form of a particulate material having a predetermined particle size, the pulverizing step may be skipped. In such a manner as described above, the graphitizable carbon serving as a starting material is obtained.

The graphitizable carbon serving as a starting material thus obtained is then heated, whereby the graphitizable carbon material under graphitization of the present invention can be obtained. The heating is performed at a temperature selected appropriately according to the type of the graphitizable carbon serving as a starting material. Preferably, the heating temperature and the heating duration are selected so that the I(101)/I(100) falls within the above-described ranges.

For example, in the case where the graphitizable carbon serving as a starting material is cokes, the heating is performed at a temperature of 1800° C. to 2200° C. and is completed in about 0.1 to 5 hours. When the heating temperature is lower than 1800° C., the partial graphitization of the graphitizable carbon serving as a starting material will not proceed appropriately, reducing the capacity density to 170 Ah/kg or less. As a result, the graphitizable carbon material under graphitization of the present invention may not be obtained.

When the heating temperature is higher than 2200° C., the graphitization of the graphitizable carbon serving as a starting material may proceed almost completely. This means that the resultant material may not be the graphitizable carbon material under graphitization of the present invention but a graphite material. The graphite material, as described above, has a capacity density of as high as 300 Ah/kg or more but is poor in diffusibility of lithium ions. For this reason, even when the graphite material is used in combination with the low crystalline carbon material, the reaction speed of the absorbing/desorbing reaction particularly in a low temperature environment cannot be increased.

The graphitizable carbon material under graphitization of the present invention obtained using cokes as a starting material includes a layered structure formed of stacked carbon layers (hexagonal carbon layers) and a turbostratic structure of the same, in which the growth of the layer structure having a graphitic three-dimensional regularity is in progress. As such, the capacity density thereof, although lower than the theoretical capacity density of graphite of 372 Ah/kg, is 170 to 280 Ah/kg, which is a high capacity density at a level causing no problem in practical use.

In a wide-angle X-ray diffraction pattern measured with CuKα radiation, the plane spacing d(002) of a (002) plane of the graphite structure is 0.338 nm to 0.342 nm. The plane spacing d(002) is also used as an index of the graphitization degree. The specific surface area is not particular limited, but preferably 1.0 m²/g to 5.0 m²/g, and more preferably 1.5 m²/g to 3.0 m²/g. The particle shape is preferably spherical, ellipsoidal or massive. The volume average particle size is preferably about 5 µm to 15 µm, and the maximum particle size is preferably about 30 µm or less.

The low crystalline carbon material can be obtained by, for example, carbonizing a precursor of the low crystalline carbon material. As the precursor of the low crystalline carbon material, the same materials as listed above as the graphitizable carbon serving as a starting material and the precursor of the same may be used.

The carbonizing is performed by, for example, heating a precursor of the low crystalline carbon material at a temperature of about 600° C. to 1500° C., and preferably at a temperature of about 1000 to 1400° C. The heating duration is not particularly limited, but is preferably 0.1 to 5 hours. The carbonizing can be performed in an inert gas atmosphere such as of nitrogen, helium, and argon.

When the heating temperature is 600° C. or lower, the carbonization will not proceed to a desired degree, and the resultant material may be a carbon material containing a residual organic component as an impurity, the residual organic component being the precursor of the low crystalline carbon material. If such a carbon material is used in a battery as a negative electrode active material, the efficiency of the battery in an early stage may deteriorate significantly. On the other hand, when the heating temperature is 1500° C. or higher, the carbonization will proceed partially, and the resultant material may not be the low crystalline carbon material that contains almost no graphite. The low crystalline carbon material that contains graphite does not allow the absorbing/desorbing reaction in a low temperature environment to proceed at a sufficiently high speed, and thus the effect of improving the output/input performance may become insufficient.

In particular, the low crystalline carbon material obtained through carbonization at 1000 to 1400° C. has a crystal structure most part of which is a turbostratic structure, and has almost no graphite layer structure composed only of graphite. In the powder X-ray diffractometry, no (101) diffraction peak was observed, and the existence probability of graphitic hexagonal net plane is small. The capacity density of the low crystalline carbon material is less than 200 Ah/kg.

In the low crystalline carbon material, numerous sites for absorbing and desorbing lithium ions are present. As such, lithium ions can rapidly diffuse in the particles of the low crystalline carbon material, and therefore, even in a low temperature environment in which the reaction speed of the absorbing/desorbing reaction is reduced, the charge/discharge reaction can proceed at high speed. By allowing such a low crystalline carbon material to be present on the surface of the particles of the graphitizable carbon material under graphitization of the present invention whose reaction speed is reduced in a low temperature environment, it is possible to obtain a negative electrode active material having a high output/input and a high capacity, without significantly reducing the output/input performance of the negative electrode active material as a whole even in a low temperature environment, and thus to obtain a negative electrode having such properties.

A preferred embodiment of the composite negative electrode active material of the present invention is such that the graphitizable carbon material under graphitization of the present invention is included as a core material, and the surface of the foregoing graphitizable carbon material is provided with a coating layer containing the low crystalline carbon material. The composite negative electrode active material in this embodiment is produced by, for example, coating the surface of the graphitizable carbon material under graphitization of the present invention with a precursor of the low crystalline carbon material, and carbonizing the precursor.

Specifically, the composite negative electrode active material in this embodiment can be obtained by the production method as shown in FIG. 1. FIG. 1 is a vertical cross-sectional view schematically showing a production method of a composite negative electrode active material 1. The production method as shown in FIG. 1 includes the steps of coating and carbonizing.

In the coating step, a graphitizable carbon material 10 under graphitization of the present invention and a precursor 11 of the low crystalline carbon material are mixed together so that the surface of the graphitizable carbon material 10 is coated with the precursor 11, thereby to give a coated material.

In the carbonizing step, the precursor 11 of the low crystalline carbon material contained in the coated material obtained in the coating step is carbonized. The carbonizing is performed in the same manner as in the carbonizing of the precursor of the low crystalline carbon material as described above. As a result, the composite negative electrode active material 1 including the graphitizable carbon material 10 whose surface is provided with a coating layer containing a low crystalline carbon material 12 is obtained.

In the composite negative electrode active material in this embodiment, the contents of the graphitizable carbon material under graphitization of the present invention and the low crystalline carbon material are not particularly limited, and can be selected appropriately from a wide range according to the type, form, application, and the like of the battery including the composite negative electrode active material; however, the content of the low crystalline carbon material is preferably 2 to 15% by mass, and the remainder is the graphitizable carbon material under graphitization of the present invention. More preferably, the content of the low crystalline carbon material is 5 to 10% by mass, and the remainder is the graphitizable carbon material under graphitization of the present invention.

When the content of the low crystalline carbon material is less than 2% by mass, the reaction speed of the absorbing/desorbing reaction in a low temperature environment may not be increased sufficiently. On the other hand, when the content of the low crystalline carbon material exceeds 15% by mass, the capacity density and the durability may be reduced.

Another preferred embodiment of the composite negative electrode active material of the present invention is such that at least part of the graphitizable carbon material under graphitization of the present invention and at least part of the low crystalline carbon material are fused together. The "fused together" as used herein means a state in which two carbon materials in a molten state are blended together and solidified. The composite negative electrode active material in this embodiment has a sufficiently high capacity density for practical use, is excellent in absorbing/desorbing reactivity, and allows the absorbing/desorbing reaction to proceed at high speed even in a low temperature environment. Moreover, since the two carbon materials are partially fused together, the mechanical strength is high, and the durability is further improved.

Figure 2:
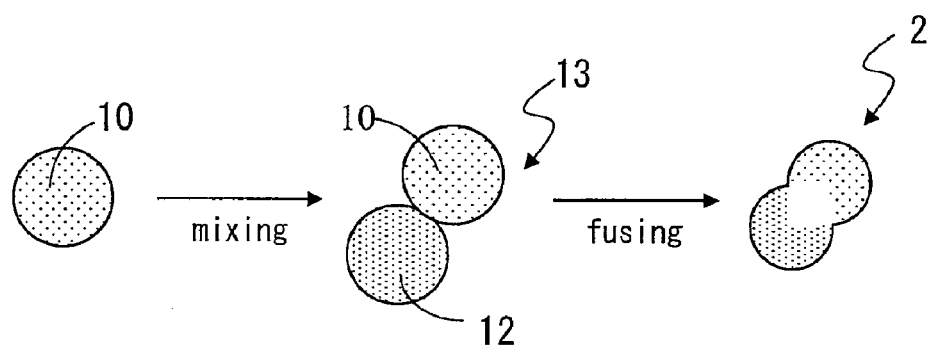
FIG. 2 is a vertical cross-sectional view schematically showing a production method of a composite negative electrode active material.

The composite negative electrode active material in this embodiment can be obtained, for example, by the production method as shown in FIG. 2. FIG. 2 is a vertical cross-sectional view schematically showing a production method of a composite negative electrode active material 2. The production method as shown in FIG. 2 includes the steps of mixing and fusing.

In the mixing step, the low crystalline carbon material 12 is added to and mixed with the graphitizable carbon material 10 under graphitization of the present invention, to give a mixture 13 of these. In the mixture 13, at least part of the graphitizable carbon material 10 and at least part of the low crystalline carbon material 12 are in contact with each other. It is preferable to use the graphitizable carbon material 10 and the low crystalline carbon material 12 such that 10 to 20% by mass of the total amount of these is the low crystalline carbon material 12 and the remainder is the graphitizable carbon material 10.

When the amount to be used of the low crystalline carbon material 12 is less than 10% by mass, the portions fused together are decreased, and the effect derived from being fused together may not be sufficiently obtained. When the amount to be used of the low crystalline carbon material 12 exceeds 20% by mass, the capacity density, charge/discharge efficiency, and the like of the composite negative electrode active material 2 thus obtained may be reduced. Here, a carbon precursor such as a molten pitch may be added to and mixed with the mixture 13 of the graphitizable carbon material 10 and the low crystalline carbon material 12. The amount of the carbon precursor to be added may be selected appropriately from a range that does not impair the favorable properties of the composite negative electrode active material thus obtained.

In the fusing step, the mixture 13 obtained in the mixing step is heated so that the graphitizable carbon material 10 and the low crystalline carbon material 12 are melted and fused together. As a result of subsequent cooling, the composite negative electrode active material 2 in which at least part of the graphitizable carbon material 10 and at least part of the low crystalline carbon material 12 are fused together is produced. The heating is performed preferably at temperature of 600 to 1500° C., and more preferably at a temperature of 1000 to 1300° C.; and is completed preferably in 0.1 to 5 hours, and more preferably in 0.5 to 2 hours. The composite negative electrode active material 2 thus obtained is pulverized as needed.

The non-aqueous electrolyte secondary battery of the present invention includes a positive electrode, a negative electrode containing the composite negative electrode active material of the present invention, a separator, and a non-aqueous electrolyte.

The positive electrode includes a positive electrode core material and a positive electrode material mixture layer. For the positive electrode core material, any positive electrode core material commonly used in this field may be used, examples of which include a porous or non-porous conductive substrate made of a metal material, such as stainless steel, titanium, aluminum, aluminum alloy and the like. The conductive substrate may be in the form of sheet, film, foil, and the like.

The positive electrode material mixture layer is provided on either one or both surfaces of the positive electrode core material in its thickness direction, preferably so as to be in contact with both surfaces. The positive electrode material mixture layer contains a positive electrode active material. The positive electrode material mixture layer may further contain a conductive agent, a binder, and the like in addition to the positive electrode active material.

For the positive electrode active material, any positive electrode active material commonly used in this field may be used by selecting according to the type, form, and the like of a non-aqueous electrolyte secondary battery to be produced. For example, in the case where the non-aqueous electrolyte secondary battery to be produced is a lithium ion secondary battery, a general positive electrode active material capable of absorbing and desorbing lithium ions may be used, and in particular, a lithium-containing composite oxide is preferable. As the lithium-containing composite oxide, any known lithium-containing composite oxide may be used, examples of which include a lithium nickel composite oxide, such as $LiNiO_2$; a lithium cobalt composite oxide, such as $LiCoO_2$; and a lithium manganese composite oxide having a spinel structure, such as $LiMn_2O_4$.

Further, a compound obtained by substituting part of the transition metal in the lithium-containing composite oxide for a different element may also be used as the positive electrode active material. Preferable examples thereof are composite oxides obtained by substituting part of Ni element in $LiNiO_2$ for Co or other elements (Al, Mn, Ti, etc.). These positive electrode active materials may be used alone or in combination of two or more.

Using the lithium-containing composite oxide can improve the cycle life characteristics and the like of the lithium ion secondary battery.

The lithium-containing composite oxide can be synthesized according to any known method. For example, the lithium-containing composite oxide is obtained by preparing a composite metal hydroxide containing a metal other than lithium by a coprecipitation method using an alkalinizing agent such as sodium hydroxide, then mixing the resultant composite metal hydroxide with a lithium compound such as lithium hydroxide, and heating the resultant mixture. It should be noted that the positive electrode material mixture layer may be formed with the use of a material that does not contain lithium at the time of producing the positive electrode, but is converted into a lithium-containing composite oxide through a subsequent treatment for allowing the material to absorb lithium. Examples of such a material include various oxides that do not contain lithium and are capable of absorbing lithium. The treatment for allowing the material to absorb lithium may be performed by any known method, examples of which include a chemical absorption method, an electrochemical absorption method, and the like.

For the conductive agent, any conductive agent commonly used in this field may be used, examples of which include graphites, such as natural graphite and artificial graphite; carbon blacks, such as acetylene black, Ketjen black, channel black, furnace black, lampblack, and thermal black; conductive fibers, such as carbon fibers and metal fibers; fluorinated carbon; powders of metal, such as aluminum; conductive whiskers, such as zinc oxide and potassium titanate; conductive metal oxides, such as titanium oxide; and organic conductive materials, such as polyphenylene derivatives. These conductive agents may be used alone or, if necessary, in combination of two or more.

For the binder, any binder commonly used in this field may be used, examples of which include polyvinylidene fluoride (PVDF), polytetrafluoroethylene, polyethylene, polypropylene, aramid resin, polyamide, polyimide, polyamide-imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyether, polyether sulfone, hexafluoropropylene, styrene-butadiene rubber, and carboxymethyl cellulose.

Alternatively, a copolymer containing two or more monomer compounds may be used, the monomer compounds being selected from tetrafluoroethylene, hexafluoropropylene, perfluoroalkylvinylether, vinylidene fluoride, chlorotrifluoroethylene, ethylene, propylene, pentafluoropropylene, fluoromethylvinylether, acrylic acid, hexadiene, and the like.

These binders may be used alone or, if necessary, in combination of two or more.

The positive electrode material mixture layer may be formed by, for example, applying a positive electrode material mixture slurry onto a surface of the positive electrode core material, and drying the slurry. The positive electrode material mixture slurry may be prepared by dissolving or dispersing the positive electrode active material, and, as needed, a conductive agent, a binder, and the like in an organic solvent. For the organic solvent, for example, dimethylformamide, dimethylacetamide, methylformamide, N-methyl-2-pyrrolidone (NMP), dimethylamine, acetone, cyclohexanone, and the like may be used. The thickness of the positive electrode material mixture layer is not particularly limited, but, preferably is about 50 to 100 μm in total when the positive electrode material mixture layer is formed on both surfaces of the positive electrode core material.

The negative electrode includes a negative electrode core material and a negative electrode material mixture layer. The negative electrode is arranged such that the negative electrode material mixture layer faces the positive electrode material mixture layer of the positive electrode with the separator interposed therebetween.

For the negative electrode core material, any negative electrode core material commonly used in this field may be used, examples of which include a porous or non-porous conductive substrate made of a metal material, such as stainless steel, nickel, copper, copper alloy and the like. The conductive substrate may be in the form of sheet, film, foil, and the like.

The negative electrode material mixture layer contains the composite negative electrode active material of the present invention, and further, may contain one or two or more known negative electrode active materials in an amount within a range that does not impair the favorable properties of the composite negative electrode active material of the present invention. The negative electrode material mixture layer may further contain a conductive agent, a binder, and the like in addition to the composite negative electrode active material of the present invention. Here, examples of the known negative electrode active materials include a metal, a metallic fiber, a carbon material other than the composite negative electrode active material of the present invention, an oxide, a nitride, silicon, a silicon compound, tin, a tin compound, and various alloy materials. For the conductive agent and the binder, the same conductive agent and binder as may be contained in the positive electrode material mixture layer may be used.

The negative electrode material mixture layer may be formed by, for example, applying a negative electrode material mixture slurry onto a surface of the negative electrode core material, and drying the slurry. The negative electrode material mixture slurry may be prepared by dissolving or dispersing the composite negative electrode active material, and, as needed, a known negative electrode active material, a conductive agent, a binder, a thickener, and the like in an organic solvent. For the organic solvent, the same organic solvent as used in preparing the positive electrode material mixture slurry may be used. The thickness of the negative electrode material mixture layer is not particularly limited, but, preferably is about 60 to 130 μm in total when the negative electrode material mixture layer is formed on both surfaces of the negative electrode core material.

The separator is provided between the positive electrode and the negative electrode. For the separator, any separator commonly used in this field may be used, examples of which include a pours sheet material made of a synthetic resin material. The synthetic resin material is not particularly limited, but is preferably polyolefin, such as polyethylene and polypropylene. The pours sheet material is, for example, a porous film, a woven fabric, a nonwoven fabric, and the like. The thickness of the separator is not particularly limited, and may be selected appropriately from the range of about 10 to 300 μm according to the type, form, application, and the like of a non-aqueous electrolyte secondary battery to be produced.

Examples of the non-aqueous electrolyte include a liquid non-aqueous electrolyte, a gelled non-aqueous electrolyte, and a solid electrolyte (e.g., a polymer solid electrolyte).

The liquid non-aqueous electrolyte includes a solute (supporting salt), a non-aqueous solvent, and as needed, various additives. The solute is normally dissolved in the non-aqueous solvent. The liquid non-aqueous electrolyte is impregnated, for example, into the separator.

For the solute, any solute commonly used in this field may be used by selecting appropriately according to the type, form, application, and the like of a non-aqueous electrolyte secondary battery to be produced. For example, in the case where the non-aqueous electrolyte secondary battery to be produced is a lithium ion secondary battery, for example, $LiClO_4$, $LiBF_4$, $LiPF_6$, $LiAlCl_4$, $LiSbF_6$, $LiSCN$, $LiCF_3SO_3$, $LiCF_3CO_2$, $LiAsF_6$, $LiB_{10}Cl_{10}$, lithium lower aliphatic carboxylate, LiCl, LiBr, LiI, chloroborane lithium, boric acid salts, imide salts, and the like may be used.

Examples of the boric acid salts include lithium bis(1,2-benzendioleate(2-)-O,O') borate, lithium bis(2,3-naphthalenedioleate(2-)-O,O') borate, lithium bis(2,2'-biphenyldioleate(2-)-O,O') borate, and lithium bis(5-fluoro-2-oleate-1-benzenesulfonate-O,O') borate. Examples of the imide salts include lithium bis(trifluoromethanesulfonyl)imide (($CF_3SO_2)_2NLi$), lithium (trifluoromethanesulfonyl)-(nonafluorobutanesulfonyl)imide (($CF_3SO_2)(C_4F_9SO_2)NLi$), and lithium bis(pentafluoroethanesulfonyl)imide(($C_2F_5SO_2)_2NLi$). These solutes may be used alone or, if necessary, in combination of two or more. The solute is dissolved in the non-aqueous solvent preferably in an amount within the range of 0.5 to 2 mol/L.

For the non-aqueous solvent, any non-aqueous solvent commonly used in this field may be used, examples of which include cyclic carbonic acid ester, chain carbonic acid ester, and cyclic carboxylic acid ester. Examples of the cyclic carbonic acid ester include propylene carbonate (PC), ethylene carbonate (EC), butylene carbonate, and the like. Examples of the chain carbonic acid ester include diethyl carbonate (DEC), ethyl methyl carbonate (EMC), dimethyl carbonate (DMC), methyl propionate, and the like. Examples of the cyclic carboxylic acid ester include γ-butyrolactone (GBL), γ-valerolactone (GVL), and the like. Alternatively, a non-aqueous solvent capable of withstanding a redox potential of 4 V class may be used. These non-aqueous solvents may be used alone or, if necessary, in combination of two or more.

Examples of the additives include a material for improving the charge/discharge efficiency, and a material for inactivating the battery. The material for improving the charge/discharge efficiency, for example, decomposes on the negative electrode to form a coating film excellent in lithium ion conductivity, thereby improving the charge-discharge efficiency. Examples of such a material include vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinylethylene carbonate (VEC), and divinylethylene carbonate. These may be used alone or in combination of two or more. Among these, at least one selected from vinylene carbonate, vinylethylene carbonate, and divinylethylene carbonate is preferable. In the above-listed compounds, part of hydrogen atoms may be substituted by fluorine atoms.

The solid electrolyte includes a solute (supporting salt) and a polymer material. For the solute, the same solute as listed above may be used. Examples of the polymer material include polyethylene oxide (PEO), polypropylene oxide (PPO), a copolymer of ethylene oxide and propylene oxide, and the like.

The non-aqueous electrolyte secondary battery of the present invention can be produced by winding or stacking the positive electrode and the negative electrode with the separator interposed therebetween to form an electrode assembly, housing the electrode assembly together with the non-aqueous electrolyte in a battery case, and then sealing the battery case. The shape of the battery may be a cylindrical shape or a prismatic shape. When the battery has a prismatic shape, the electrode assembly may be a flat electrode assembly formed by compressing an electrode assembly wound into an elliptic cylindrical shape from both sides, or alternatively, may be a flat electrode assembly formed by stacking two or more positive electrode plates and negative electrode plates with the separator interposed therebetween.

EXAMPLES

In the following, specific embodiments of the present invention are described. It should be noted, however, the present invention is not limited to these examples.

Example 1

Production of Positive Electrode Active Material

For the positive electrode active material, a lithium nickel composite oxide represented by the composition formula: $LiNi_{0.8}Co_{0.15}Al_{0.05}O_2$ was used.

To an aqueous nickel sulfate solution, cobalt sulfate and aluminum sulfate were added at a predetermined ratio to prepare a saturated aqueous solution. To the saturated aqueous solution thus obtained, an aqueous sodium hydroxide solution was slowly added dropwise while stirring to neutralize the solution, whereby a ternary nickel hydroxide $Ni_{0.8}Co_{0.15}Al_{0.05}(OH)_2$ was precipitated as a precipitate. This precipitate was collected by filtration, washed with water, and dried at 80° C. The nickel hydroxide thus obtained had a volume average particle size of about 10 μm.

Subsequently, to the ternary nickel hydroxide, a monohydrate of lithium hydroxide was added and mixed such that the ratio of the total number of Ni, Co and Al atoms to the number of Li atoms was 1:1.03. The resultant mixture was heated at 800° C. in an oxygen atmosphere for 10 hours, to give a lithium nickel composite oxide represented by the composition formula: $LiNi_{0.8}Co_{0.15}Al_{0.05}O_2$. As a result of the analysis by the powder X-ray diffractometry, it was confirmed that the lithium nickel composite oxide thus obtained had a single-phase hexagonal layer structure and contained Co and Al dissolved therein. By subsequent pulverization and classification, a positive electrode active material powder having a volume average particle size of about 9 μm was obtained.

[Formation Of Positive Electrode]

To 100 parts by mass of the positive electrode active material thus obtained, 5 parts by mass of acetylene black serving as the conductive material was added. The resultant mixture and an N-methyl-pyrrolidone (NMP) solution of polyvinylidene fluoride (hereinafter "PVdF") serving as the binder were kneaded together, to prepare a positive electrode material mixture slurry in a paste state. The PVdF was added such that the amount of PVdF used was 5 parts by mass per 100 parts by mass of the positive electrode active material. Subsequently, the positive electrode material mixture slurry thus obtained was applied onto both surfaces of a 20-μm-thick aluminum foil, dried, and then rolled, to form a 0.075-mm-thick positive electrode plate with the positive electrode material mixture layer being 100 mm in width and 3400 mm in length. The total thickness of the positive electrode material mixture layers on both surfaces was 55 μm.

[Production of Composite Negative Electrode Active Material]

To 100 parts by mass of pitch (product type: AR24Z softening point: 293.9° C., available from Mitsubishi Gas Chemical Company, Inc.), 5 parts by mass of para-xylene glycol, and 3 parts by mass of boric acid were added. The temperature of the resultant mixture was raised to 300° C. under normal pressure to melt the mixture, and the mixture was allowed to stand was for 2 hours. The polymerized pitch thus obtained was heated at 800° C. for 1 hour in an argon atmosphere, thereby to prepare a coke. The coke thus prepared was pulverized to a mean particle size of about 10 μm, and then heated at 2000° C. in an argon atmosphere, whereby the graphitizable carbon material under graphitization of the present invention was produced.

The graphitizable carbon material thus produced was analyzed by a powder X-ray diffractometry to measure the graphitization degree thereof. The result showed that d(002) was 0.340 nm, and I(101)/I(100) was 0.70. The specific surface area was 2.0 m$^2$/g. It is understood from the result of I(101)/I(100) being more than 0 and less than 1.0 that this graphitizable carbon material contains a layered structure formed of stacked carbon layers and the layered structure partially has a three-dimensional regularity.

The measuring conditions of the X-ray diffractometry were as follows: as an X-ray diffractometer, X-ray diffractometer (trade name: RINT 2500) available from Rigaku Corporation was used; as an internal standard sample, high crystalline silicone was used; and as an analysis software, Carbon Analyzer G (trade name, available from Ryoka Systems Inc.) was used. The tube voltage and the tube current at the time of measuring were set at 40 kV and 200 mA, respectively.

To 100 parts by mass of the graphitized carbon material, 5 parts by mass of isotropic pitch (the precursor of the low crystalline carbon material, softening point: 280° C., available from Osaka Gas Chemicals Co., Ltd.) was added and mixed. The resultant mixture was heated at 1200° C. in an argon atmosphere. In such a manner, a composite negative electrode active material in which the surfaces of particles of the graphitizable carbon material under graphitization of the present invention were provided with a coating layer containing the low crystalline carbon material was produced. By subsequent pulverization and classification, a composite negative electrode active material having a volume average particle size of about 9 μm was obtained.

[Formation of Negative Electrode Plate]

To 100 parts by mass of the composite negative electrode active material thus obtained, an N-methyl-pyrrolidone solution of PVdF was added and kneaded, to prepare a negative electrode material mixture slurry in a paste state. The PVdF was added such that the amount of PVdF used was 8 parts by mass per 100 parts by mass of the composite negative electrode active material. Subsequently, the negative electrode material mixture slurry thus obtained was applied onto both surfaces of a 10-μm-thick copper foil, dried, and then rolled, to form a 0.078-mm-thick negative electrode plate with the negative electrode material mixture layer being 105 mm in width and 3510 mm in length. The total thickness of the negative electrode material mixture layers on both surfaces was 68 μm.

[Fabrication of Non-Aqueous Electrolyte Secondary Battery]

The positive electrode plate and the negative electrode plate obtained in the above were wound in a coil with a polyethylene porous film (separator) having a thickness of 0.020 mm and a width of 108 mm interposed therebetween, to form a cylindrical electrode assembly. The electrode assembly thus obtained was housed in a battery case having a diameter of 32 mm and a height of 120 mm, and 40 g of the non-aqueous electrolyte was injected thereto. Thereafter, the battery case was sealed, and thus the non-aqueous electrolyte secondary battery of the present invention was fabricated. The fabricated battery was designed such that the capacity density of the negative electrode in a full-charged state was about 200 Ah/kg. For the non-aqueous electrolyte, a non-aqueous electrolyte prepared by dissolving $LiPF_6$ serving as a supporting salt at a concentration of 1 mol/liter in a mixed solvent containing ethylene carbonate (EC), dimethyl carbonate (DMC), ethyl methyl carbonate (EMC) in a volume ratio of 3:3:4 was used.

Example 2

The non-aqueous electrolyte secondary battery of the present invention was fabricated in the same manner as in Example 1 except that a composite negative electrode active material synthesized as follows was used.

[Production of Composite Negative Electrode Active Material]

First, 90 parts by mass of the graphitizable carbon material under graphitization of the present invention and 10 parts by mass of the low crystalline carbon material of the present invention were dry-mixed. To 100 parts by mass of the resultant mixture, 3 parts by mass of isotropic pitch (softening point: 280° C., available from Osaka Gas Chemicals Co., Ltd.) was added and mixed, and then heated at 1000° C. in an argon atmosphere. In such a manner, a composite negative electrode active material in which the graphitizable carbon material under graphitization of the present invention and the low crystalline carbon material were fused together in a particle level was produced. By subsequent pulverization and classification, a composite negative electrode active material having a volume average particle size of about 9 μm was obtained.

For the graphitizable carbon material under graphitization of the present invention, the same material produced in the same manner as in Example 1 was used. The low crystalline carbon material was produced in the following manner. To 100 parts by mass of pitch (product type: AR24Z softening point: 293.9° C., available from Mitsubishi Gas Chemical Company, Inc.), 5 parts by mass of para-xylene glycol, and 3 parts by mass of boric acid were added. The temperature of the resultant mixture was raised to 300° C. under normal pressure to melt the mixture, and the mixture was allowed to stand was for 2 hours. The polymerized pitch thus obtained was heated at 800° C. for 1 hour in an argon atmosphere, thereby to prepare a coke. The coke thus prepared was pulverized to a mean particle size of about 10 μm, and then heated at 1200° C. in an argon atmosphere, whereby the low crystalline carbon material was produced.

The low crystalline carbon material thus produced was analyzed by a powder X-ray diffractometry to measure the graphitization degree thereof. The result showed that d(002) was 0.350 nm, and no peak representing (101) diffraction was observed. It was confirmed from this result that almost no graphitic layered structure was contained therein. The specific surface area was 3.5 $m^2/g$.

Comparative Example 1

A non-aqueous electrolyte secondary battery of Comparative Example 1 was fabricated in the same manner as in Example 1 except that in place of the composite negative electrode active material produced in Example 1 in which the surface of the graphitizable carbon material under graphitization of the present invention was provided with a coating layer containing the low crystalline carbon material, the graphitizable carbon material under graphitization of the present invention was used alone as the negative electrode active material.

Comparative Example 2

A non-aqueous electrolyte secondary battery of Comparative Example 2 was fabricated in the same manner as in Example 2 except that in place of the composite negative electrode active material produced in Example 2 in which the graphitizable carbon material under graphitization of the present invention and the low crystalline carbon material were fused together, the low crystalline carbon material was used alone as the negative electrode active material.

Comparative Example 3

A non-aqueous electrolyte secondary battery of Comparative Example 3 was fabricated in the same manner as in Example 1 except that in place of the composite negative electrode active material produced in Example 1 in which the surface of the graphitizable carbon material under graphitization of the present invention was provided with a coating layer containing the low crystalline carbon material, a composite negative electrode active material produced by dry-mixing the graphitizable carbon material under graphitization of the present invention and a non-graphitizable carbon material (trade name: Carbotron P, average particle size: 10 μm, specific surface area: 6.1 $m^2/g$, available from Kureha Corporation) in a ratio by mass of 90:10 was used.

Comparative Example 4

A non-aqueous electrolyte secondary battery of Comparative Example 4 was fabricated in the same manner as in Example 1 except that in place of the composite negative electrode active material produced in Example 1 in which the surface of the graphitizable carbon material under graphitization of the present invention was provided with a coating layer containing the low crystalline carbon material, a composite negative electrode active material produced in the following manner was used.

First, 100 parts by mass of a graphite material (trade name: MAG-10, average particle size: 10 μm, specific surface area: 3.0 $m^2/g$, available from Hitachi Chemical Co., Ltd.), and 5 parts by mass of isotropic pitch (softening point: 280° C., available from Osaka Gas Chemicals Co., Ltd.) were mixed together. The resultant mixture was then heated at 1200° C. in an argon atmosphere. In such a manner, a composite negative electrode active material in which the surfaces of graphite particles were provided with a coating layer containing the low crystalline carbon material was produced.

Experimental Example 1

The non-aqueous electrolyte secondary batteries of Examples 1 to 2 and Comparative Examples 1 to 4 were subjected to 3 cycles of charge/discharge in a 25° C. environment in which charge was performed at a constant current of 2.7 A with the end-of-charge voltage being set at 4.1 V, and discharge was performed at a constant current of 2.7 A with the end-of-discharge voltage being set at 2.5 V. The discharge capacity at the third cycle was referred to as an initial capacity. Thereafter, in order to measure the outputs of these batteries, a current-voltage characteristic test was conducted in the following procedures.

Figure 3:
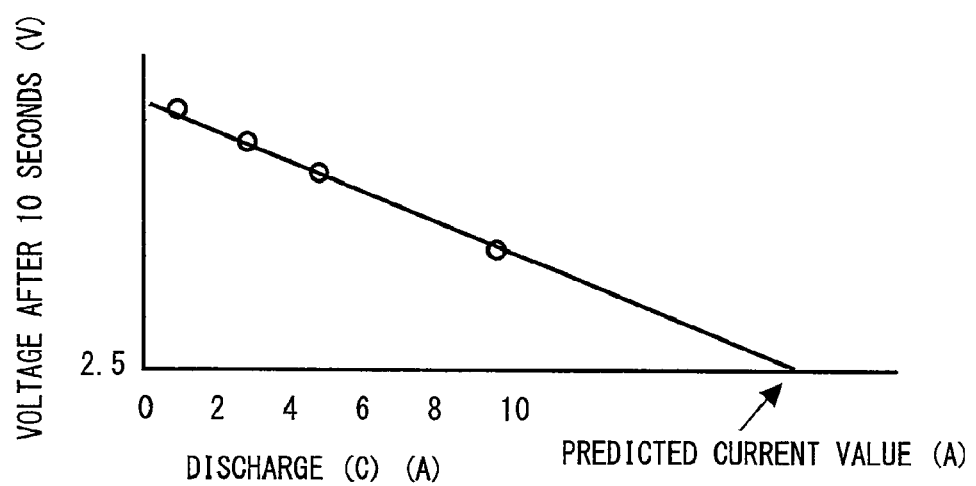
FIG. 3 is a graph showing the relationship between a discharge current and a voltage after 10 seconds, in non-aqueous electrolyte secondary batteries of Examples 1 to 2 and Comparative Examples 1 to 4.

First, each battery was charged at a constant current in a 25° C. environment so as to fall in a 50% charged state (SOC). To the battery after charge, a discharge pulse and a charge pulse were applied repeatedly for 10 seconds each at a current from 1 C up to 10 C. The battery voltage every 10 seconds after the start of application of the discharge pulse was measured and the measured values were plotted versus the current values. The plotted points of voltage were linearly approximated to a straight line by a least squares method, and the line was extrapolated to 2.5 V, which was the end-of-discharge voltage, to determine a predicted current value (A) at 2.5 V. An output (W) was calculated by multiplying the predicted current value (A) by 2.5 (V). The results are shown in Table 3. FIG. 3 is a graph showing the relationship between a discharge current (C)/A and a voltage after 10 seconds/V in the non-aqueous electrolyte secondary batteries of Examples 1 to 2 and Comparative Examples 1 to 4.

Subsequently, these batteries were cooled for 6 hours with the environmental temperature being set at −10° C. After it was confirmed that the battery surface temperatures were approximately equal to the environmental temperature, the current-voltage characteristic test above was conducted again and the outputs (W) were calculated. The initial capacities and outputs thus obtained are shown in Table 1. Here, all of the graphitizable carbon materials in Table 1 are the graphitizable carbon materials under graphitization of the present invention.

The battery of Comparative Example 1 was equivalent to the batteries of Examples in terms of the initial capacity and the output in a 25° C. environment, but was inferior thereto in terms of the output in a −10° C. environment. This is attributable to that, in a low temperature environment, the reaction speed of the lithium ion absorbing/desorbing reaction was decreased in the vicinities of the surfaces of the particles of the graphitizable carbon material under graphitization of the present invention, failing to provide a sufficient output.

The batteries of Comparative Example 2 were inferior in terms of both the initial capacity and the output. This is attributable to that the positive electrode capacity was consumed because of a small reversible capacity density and a large irreversible capacity density of the low crystalline carbon material, causing the capacity of the battery to be reduced to an extremely low level. Since the capacity was reduced, the output also tended to be reduced, resulting in an unsatisfactory level of performance of the battery.

The initial capacity of the battery of Comparative Example 3 was slightly reduced. This is attributable to a large irreversible capacity density of the non-graphitizable carbon material. The output also was smaller than those of the batteries of Examples. This is presumably because a mere mixing of the non-graphitizable carbon material with the graphitizable carbon material under graphitization of the present invention was not enough to increase the reaction speed of the lithium ion absorbing/desorbing reaction, and moreover, despite of the turbostratic structure contained therein, did not make almost no contribution to the achievement of a higher output because the non-graphitizable carbon material absorbs or desorbs lithium ions not through intercalation reaction but through a complicated mechanism.

The battery of Comparative Example 4 had a large initial capacity. This is attributable to a high capacity density and a

TABLE 1

| Battery | Feature of negative electrode active material | Initial capacity (Ah) | Output (W) 25° C. | Output (W) −10° C. |
| --- | --- | --- | --- | --- |
| Example 1 | surface of graphitizable carbon material is provided with coating layer of low crystalline carbon material | 7.2 | 640 | 300 |
| Example 2 | graphitizable carbon material and low crystalline carbon material are fused together | 7.1 | 640 | 290 |
| Comparative Example 1 | graphitizable carbon material only | 7.2 | 640 | 200 |
| Comparative Example 2 | low crystalline carbon material only | 6.5 | 510 | 160 |
| Comparative Example 3 | mixture of graphitizable carbon material and non-graphitizable carbon material | 6.8 | 550 | 220 |
| Comparative Example 4 | surface of graphite material is provided with coating layer of low crystalline carbon material | 7.4 | 610 | 200 |

From Table 1, the batteries of Examples 1 and 2 had comparatively large initial capacities, and in terms of the output also, were excellent in a 25° C. environment and even in a low temperature environment such as of −10° C. This is attributable to that, as the negative electrode active material, the graphitizable carbon material under graphitization of the present invention whose surface was coated or fused together with the low crystalline carbon material was used, and thus the reaction of absorbing and desorbing lithium ions was facilitated.

low irreversible capacity density of the graphite, which enables the battery to have a high capacity. However, the output of the battery of Comparative Example 4 was small particularly in a low temperature zone. In a graphite material having a high crystalline layer structure, the diffusion channels for absorbing and desorbing lithium ions are limited and the crystal orientation is high, and therefore, the graphite material tends to be poor in charge/discharge characteristics at a large current.

For the reasons above, when the graphite material is used in combination with the coating layer of the low crystalline carbon material, the effect of the low crystalline carbon material is sufficiently exerted in a normal temperature zone and a high output performance can be obtained; however, by the aid of the low crystalline carbon material only, a sufficient effect cannot be obtained in a low temperature zone.

From the foregoing results, it is understood that by using the composite negative electrode active material of the present invention, it is possible to provide a non-aqueous electrolyte secondary battery having a high output performance even in a low temperature zone.

Example 3

The non-aqueous electrolyte secondary batteries A to J of the present invention were fabricated in the same manner as in Example 1 except that a positive electrode plate and negative electrode plates formed in the following manner were used.
[Production of Positive Electrode Active Material and Formation of Positive Electrode Plate]

For the positive electrode active material, a lithium nickel composite oxide represented by the composition formula: $LiNi_{0.4}CO_{0.3}Mn_{0.3}O_3$ was used.

To an aqueous nickel sulfate solution, cobalt sulfate and manganese sulfate were added at a predetermined ratio to prepare a saturated aqueous solution. To the saturated aqueous solution thus obtained, an aqueous sodium hydroxide solution was slowly added dropwise while stirring to neutralize the solution, whereby a ternary nickel hydroxide $Ni_{0.4}CO_{0.3}Mn_{0.3}(OH)_2$ was precipitated as a precipitate. The precipitate was collected by filtration, washed with water, and dried at 80° C.

Subsequently, to the ternary nickel hydroxide, a monohydrate of lithium hydroxide was added and mixed such that the ratio of the total number of Ni, Co and Mn atoms to the number of Li atoms was 1:1.03. The resultant mixture was heated at 850° C. in dry air for 10 hours, to give a lithium nickel composite oxide represented by the composition formula: $LiNi_{0.4}CO_{0.3}Mn_{0.3}O_2$. As a result of the analysis by the powder X-ray diffractometry, it was confirmed that the lithium nickel composite oxide thus obtained had a single-phase hexagonal layer structure and contained Co and Mn dissolved therein. By subsequent pulverization and classification, a positive electrode active material powder having a volume average particle size of about 10 μm was obtained. A positive electrode plate was formed in the same manner as in Example 1 except that the positive electrode active material thus obtained was used.
[Production of Negative Electrode Active Material and Formation of Negative Electrode Plate]

To 100 parts by mass of pitch (product type: AR24Z softening point: 293.9° C., available from Mitsubishi Gas Chemical Company, Inc.), 5 parts by mass of para-xylene glycol, and 5 parts by mass of boric acid were added. The temperature of the resultant mixture was raised to 300° C. under normal pressure to melt the mixture, and the mixture was allowed to stand was for 2 hours. The polymerized pitch thus obtained was heated at 800° C. for 1 hour in an argon atmosphere, thereby to prepare a graphitizable carbon serving as a starting material. The graphitizable carbon serving as a starting material thus prepared was pulverized to a volume average particle size of about 10 μm, and then heated at a temperature shown in Table 2 in an argon atmosphere, whereby the graphitizable carbon material under graphitization of the present invention was produced.

In addition, the graphitizable carbon serving as a starting material prepared in the same manner as described above was heated at a temperature shown in Table 2 in an argon atmosphere, whereby the low crystalline carbon material was produced.

Next, the graphitizable carbon material under graphitization of the present invention and the low crystalline carbon material were dry-mixed in a ratio by mass of 85:15. To 100 parts by mass of the resultant mixture, 3 parts by mass of isotropic pitch (softening point: 280° C., available from Osaka Gas Chemicals Co., Ltd.) was added and mixed, and then heated at 900° C. in an argon atmosphere. In such a manner, a composite negative electrode active material in which the graphitizable carbon material under graphitization of the present invention and the low crystalline carbon material were fused together in a particle level was produced. By subsequent pulverization and classification, a composite negative electrode active material having a volume average particle size of about 11 μm was obtained. A negative electrode plate was formed in the same manner as in Example 1 except that the composite negative electrode active material thus obtained was used.

Table 2 shows the initial capacities and outputs in a −10° C. environment of the non-aqueous electrolyte secondary batteries A to J. The graphitizable carbon materials in Table 2 are the graphitizable carbon materials under graphitization of the present invention

TABLE 2

| Battery | Heating temperature (° C.) graphitizable carbon material | Heating temperature (° C.) low crystalline carbon material | Initial capacity (Ah) | Output (−10° C.: W) |
|---|---|---|---|---|
| A | 1700 | 900 | 5.9 | 220 |
| B | 1700 | 1000 | 5.9 | 240 |
| C | 1800 | 900 | 6.0 | 240 |
| D | 1800 | 1200 | 6.3 | 300 |
| E | 2000 | 1300 | 6.5 | 310 |
| F | 2000 | 1400 | 6.6 | 300 |
| G | 2000 | 1500 | 6.6 | 190 |
| H | 2200 | 1200 | 6.7 | 280 |
| I | 2300 | 1200 | 6.8 | 190 |
| J | 2400 | 1600 | 6.8 | 160 |

Table 2 shows that the higher the heating temperature of the graphitizable carbon material under graphitization of the present invention was, the more the initial capacity was improved. In the batteries A and B including the graphitizable carbon material under graphitization of the present invention produced at the lowest heating temperature of 1700° C., the initial capacities were less than 6 Ah, which were small as compared with those of the other batteries. This presumably because the graphite structure in the graphitizable carbon material under graphitization of the present invention was not yet developed sufficiently, resulted in a low small capacity density and a large irreversible capacity density, and thus in a large loss of the positive electrode capacity.

From the result that the heating temperatures of 1800° C. or higher provided batteries with initial capacities of 6.3 Ah or more, it is understood that in order to obtain a graphitizable carbon material under graphitization of the present invention to be suitably used in the present invention, the heating temperature is preferably 1800° C. or higher. On the other hand, in view of the output characteristics, when the heating temperature was about 2200° C. or lower, comparatively favorable output characteristics in a low temperature environment were obtained; however, when the heating temperature was 2300° C. or higher, namely, in the batteries I and J, the output was sharply reduced. This is presumably because the graphitization of the graphitizable carbon material under graphitization of the present invention proceeded excessively, causing the ability of absorbing and desorbing lithium to decrease.

As for the heating temperature for obtaining the low crystalline carbon material, in the batteries including the low crystalline carbon materials produced at a heating temperature within the range of about 1000° C. to 1400° C., high output characteristics were obtained in a low temperature zone. In the battery G in which the heating temperature was 1500° C., the output was considerably lower than that of the battery F in which the heating temperature was 1400° C. The output performance particularly in a low temperature zone is greatly dependent on the crystallinity of the surfaces of the particles of the graphitizable carbon material under graphitization of the present invention, the state of the diffusion channels for lithium ions, and other conditions.

In other words, when the heating temperature is 1500° C., the carbon material becomes highly crystallized, and the diffusion channels for lithium ions are decreased, causing the diffusion speed of lithium ions to decrease. Conversely, when the heating temperature is as low as 900° C., namely, in the battery C, the carbon material is hardly crystallized, and thus the diffusion channels for lithium ions are not formed sufficiently.

From the foregoing results, it is understood that the heating temperature for obtaining a graphitizable carbon material under graphitization is preferably 1800° C. to 2200° C., and the heating temperature for obtaining a low crystalline carbon material to be fused together with the graphitizable carbon material under graphitization is preferably 1000° C. to 1400° C.

INDUSTRIAL APPLICABILITY

A non-aqueous electrolyte secondary battery including the composite negative electrode active material of the present invention demonstrates a high output/input performance particularly in a low temperature environment and has a long life, and therefore can be suitably used as a secondary battery for assisting the electric motor in a hybrid electric vehicle, fuel cell-powered vehicle, and the like. Further, it is applicable as a power source for driving an electric tool, cleaner, robot, and the like, a large-sized power source for storing power, and other uses. Furthermore, it can be used as a power source for a so-called plug-in HEV for which further growth is expected, the plug-in HEV running for a certain distance exclusively with a fully battery-powered electric motor and, after the battery capacity is reduced below a predetermined value, running in an HEV mode in which the electric motor and the gasoline engine operate in combination.

The invention claimed is:

1. A composite negative electrode active material comprising:
    a graphitizable carbon material (A) containing a layered structure formed of stacked carbon layers partially having a three-dimensional regularity; and
    a carbon material (B), wherein:
    a ratio $I(101)/I(100)$ of the graphitizable carbon material (A) satisfies $0.5 < I(101)/I(100) < 1.0$,
    the carbon material (B) is capable of absorbing and desorbing lithium via an interlayer intercalation reaction, and a ratio $I(101)/I(100)$ of the carbon material (B) is not less than 0 and lower than the ratio $I(101)/I(100)$ of the graphitizable carbon material (A),
    the ratio $I(101)/I(100)$ is a ratio of a peak intensity (101) attributed to a (101) plane at $2\theta$=about 44° to a peak intensity $I(100)$ attributed to a (100) plane at $2\theta$=about 42° in a wide-angle X-ray diffraction pattern measured with CuKα radiation, and
    a surface of the graphitizable carbon material (A) is coated with the carbon material (B), or at least part of the graphitizable carbon material (A) and at least part of the carbon material (B) are fused together.

2. The composite negative electrode active material in accordance with claim 1, wherein the graphitizable carbon material (A) is coated with the carbon material (B) by coating the surface of the graphitizable carbon material (A) with a precursor of the carbon material (B) and then carbonizing the precursor.

3. The composite negative electrode active material in accordance with claim 2, wherein the precursor of the carbon material (B) is carbonized by heating the precursor at 600 to 1500° C.

4. The composite negative electrode active material in accordance with claim 2, wherein the precursor of the carbon material (B) is cokes.

5. The composite negative electrode active material in accordance with claim 1, wherein the graphitizable carbon material (A) is obtained by heating a graphitizable carbon material (C) serving as a starting material.

6. The composite negative electrode active material in accordance with claim 5, wherein the graphitizable carbon material (C) is cokes and is heated at a temperature of 1800° C. to 2200° C.

7. A non-aqueous electrolyte secondary battery comprising a positive electrode, a negative electrode containing the composite negative electrode active material of claim 1, a separator, and a non-aqueous electrolyte.

* * * * *

UNITED STATES PATENT AND TRADEMARK OFFICE
CERTIFICATE OF CORRECTION

PATENT NO. : 8,399,131 B2
APPLICATION NO. : 12/602560
DATED : March 19, 2013
INVENTOR(S) : Yoshiyuki Ozaki et al.

It is certified that error appears in the above-identified patent and that said Letters Patent is hereby corrected as shown below:

Title Page: Item 73

Specifically, please change "Panasonic Corporation, Osaka (JP)" to -- Panasonic Corporation, Osaka (JP) and Osaka Gas Co., Ltd. (JP) --.

Signed and Sealed this
Seventeenth Day of September, 2013

Teresa Stanek Rea
*Deputy Director of the United States Patent and Trademark Office*